United States Patent
Chen et al.

(10) Patent No.: US 12,118,943 B2
(45) Date of Patent: Oct. 15, 2024

(54) DRIVING CIRCUIT, DISPLAY PANEL AND DISPLAY DEVICE

(71) Applicant: SHENZHEN CHINA STAR OPTOELECTRONICS SEMICONDUCTOR DISPLAY TECHNOLOGY CO., LTD, Guangdong (CN)

(72) Inventors: Zhiyi Chen, Guangdong (CN); Zhenling Wang, Guangdong (CN)

(73) Assignee: SHENZHEN CHINA STAR OPTOELECTRONICS SEMICONDUCTOR DISPLAY TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/623,464

(22) PCT Filed: Dec. 16, 2021

(86) PCT No.: PCT/CN2021/139978
§ 371 (c)(1),
(2) Date: Jun. 22, 2023

(87) PCT Pub. No.: WO2023/108710
PCT Pub. Date: Jun. 22, 2023

(65) Prior Publication Data
US 2024/0046876 A1 Feb. 8, 2024

(30) Foreign Application Priority Data
Dec. 16, 2021 (CN) .......................... 202111547830.2

(51) Int. Cl.
*G09G 3/3258* (2016.01)
*G09G 3/3266* (2016.01)
*G09G 3/3275* (2016.01)

(52) U.S. Cl.
CPC ......... *G09G 3/3258* (2013.01); *G09G 3/3266* (2013.01); *G09G 3/3275* (2013.01);
(Continued)

(58) Field of Classification Search
CPC .. G09G 3/3258; G09G 3/3266; G09G 3/3275; G09G 2300/0842; G09G 2320/0276
See application file for complete search history.

(56) References Cited

U.S. PATENT DOCUMENTS

2016/0049113 A1    2/2016  Park
2016/0189623 A1*   6/2016  Miwa ................... G09G 3/3233
                                                            345/212
(Continued)

FOREIGN PATENT DOCUMENTS

CN      103794187 A     5/2014
CN      103886831 A     6/2014
(Continued)

OTHER PUBLICATIONS

International Search Report in International application No. PCT/CN2021/139978, mailed on Sep. 14, 2022.
(Continued)

*Primary Examiner* — Lixi C Simpson
(74) *Attorney, Agent, or Firm* — PV IP PC; Wei Te Chung

(57) ABSTRACT

A driving circuit, a display panel, and a display device are disclosed. In the driving circuit, the display panel, and the display device disclosed in the present disclosure, the gamma module outputs the first initialization voltage and the second initialization voltage when the display panel is in the internal compensation mode, and the gamma module outputs the third initialization voltage and the reference voltage when the display panel is in the detection mode.

15 Claims, 4 Drawing Sheets

(52) U.S. Cl.
CPC ............... *G09G 2300/0842* (2013.01); *G09G 2320/0276* (2013.01)

(56) References Cited

U.S. PATENT DOCUMENTS

| | | | |
|---|---|---|---|
| 2020/0020278 A1 | 1/2020 | Lee | |
| 2020/0202777 A1 | 6/2020 | Lee | |
| 2021/0150971 A1 | 5/2021 | Pyun | |
| 2022/0208120 A1* | 6/2022 | Liu | G09G 3/3258 |
| 2022/0254300 A1* | 8/2022 | Pyun | G09G 3/32 |

FOREIGN PATENT DOCUMENTS

| | | |
|---|---|---|
| CN | 104715716 A | 6/2015 |
| CN | 105761678 A | 7/2016 |
| CN | 110189697 A | 8/2019 |
| CN | 111312160 A | 6/2020 |
| CN | 112071265 A | 12/2020 |
| CN | 112349241 A | 2/2021 |
| CN | 113299224 A | 8/2021 |
| JP | 2016009136 A | 1/2016 |
| WO | 2020056672 A1 | 3/2020 |

OTHER PUBLICATIONS

Written Opinion of the International Search Authority in International application No. PCT/CN2021/139978, mailed on Sep. 14, 2022.

Chinese Office Action issued in corresponding Chinese Patent Application No. 202111547830.2 dated Sep. 5, 2022, pp. 1-7.

Japanese Office Action issued in corresponding Japanese Patent Application No. 特願 2021-577700 dated Feb. 13, 2024, pp. 1-4.

* cited by examiner

DRIVING CIRCUIT, DISPLAY PANEL AND DISPLAY DEVICE

FIELD OF INVENTION

The present disclosure relates to the field of display technology, and more particularly, to a driving circuit, a display panel, and a display device.

BACKGROUND OF INVENTION

Organic light-emitting diode (OLED) display devices have the advantages of high brightness, wide viewing angles, fast response, and low power consumptions, and have been widely used in the field of high-performance display at present. In an OLED display device, pixels are arranged in a matrix including multiple rows and columns. Each pixel is usually composed of two transistors and a capacitor, commonly known as a 2T1C circuit, but the transistors have the problem of threshold voltage shift. Therefore, an OLED display device requires a corresponding compensation structure.

At present, a compensation structure of the OLED display device generally includes an internal compensation mode and a detection mode. In the OLED display device compatible with the internal compensation mode and detection mode, the required power sources for the internal compensation mode and detection mode are different, and thus it necessary to add different voltages of power supplies, thereby increasing the use of the power resources.

SUMMARY OF INVENTION

Technical Problem

A driving circuit, a display panel, and a display device are disclosed in the present disclosure, which is compatible with both the internal compensation mode and detection mode without adding different voltages of power supplies.

Technical Solutions

In a first aspect, a driving circuit configured for driving a display panel is disclosed in the present disclosure, which includes:
 a gamma module configured for outputting a first initialization voltage and a second initialization voltage when the display panel is in an internal compensation mode, wherein the gamma module is further configured for outputting a third initialization voltage and a reference voltage when the display panel is in a detection mode; and
 a light-emitting module electrically connected with the gamma module, wherein when the display panel is in the internal compensation mode, the gamma module provides the first initialization voltage and the second initialization voltage to the light-emitting module to drive the light-emitting module to emit light; when the display panel is in the detection mode, the gamma module provides the third initialization voltage and the reference voltage to the light-emitting module to drive the light-emitting module to emit light. In the driving circuit disclosed in the present disclosure, the light-emitting module includes:
 a driving transistor, wherein a gate of the driving transistor is electrically connected with a first node, one of a source and a drain of the driving transistor is electrically connected with a first power source, and the other of the source and the drain of the driving transistor is electrically connected with a second node;
 a first transistor, wherein a gate of the first transistor is electrically connected with a scan line, one of a source and a drain of the first transistor is electrically connected with a data line, and the other of the source and the drain of the first transistor is electrically connected with the first node;
 a second transistor, wherein a gate of the second transistor is electrically connected with a control line, one of a source and a drain of the second transistor is electrically connected with the gamma module, and the other of the source and the drain of the second transistor is electrically connected with the first node;
 a third transistor, wherein a gate of the third transistor is electrically connected with a detection line, one of a source and a drain of the third transistor is electrically connected with the second node, the other of the source and drain of the third transistor is electrically connected with a first terminal of a first switching component and a first terminal of a second switching component, a second terminal of the first switching component is electrically connected with a first terminal of a detection source, and a second terminal of the second switching component and a second terminal of the detection source are electrically connected with the gamma module;
 a capacitor, wherein a first terminal of the capacitor is electrically connected with the first node, and a second terminal of the capacitor is electrically connected with the second node; and
 a light-emitting component, wherein a first terminal of the light-emitting component is electrically connected with the second node, and a second terminal of the light-emitting component is electrically connected with a second power source.

In the driving circuit disclosed in the present disclosure, the gamma module includes a first output terminal and a second output terminal;
 wherein the first output terminal is electrically connected with one of the source and the drain of the second transistor and the second terminal of the detection source, and the second output terminal is electrically connected with the second terminal of the second switching component.

In the driving circuit disclosed in the present disclosure, the gamma module includes a first output terminal, a second output terminal, and a third output terminal;
 wherein the first output terminal is electrically connected with one of the source and the drain of the second transistor, the second output terminal is electrically connected with the second terminal of the detection source, and the third output terminal is electrically connected with the second terminal of the second switching component.

In the driving circuit disclosed in the present disclosure, the other of the source and the drain of the third transistor is further electrically connected with a first terminal of a third switching component, and a second terminal of the third switching component is electrically connected with the gamma module.

In the driving circuit disclosed in the present disclosure, the gamma module includes a first output terminal, a second output terminal, a third output terminal, and a fourth output terminal;

wherein the first output terminal is electrically connected with one of the source and the drain of the second transistor, the second output terminal is electrically connected with the second terminal of the detection source, the third output terminal is electrically connected with the second terminal of the second switching component, and the fourth output terminal is electrically connected with the second terminal of the third switching component.

In the driving circuit disclosed in the present disclosure, when the display panel is in the internal compensation mode, the third transistor is conducted, the fourth transistor is conducted, the first switching component is cut off, the second switching component is conducted, the first initialization voltage is provided to the first node through the third transistor, and the second initialization voltage is provided to the second node through the second switching component and the fourth transistor.

In the driving circuit disclosed in the present disclosure, when the display panel is in the detection mode, the third transistor is cut off, the fourth transistor is conducted, the first switching component is conducted, the second switching component is conducted, the third initialization voltage is provided to the second node through the second switching component and the fourth transistor, the reference voltage is provided to the detection source, and the detection source detects a voltage of the second node through the first switching component.

In a second aspect, a display panel is further disclosed in the present disclosure, which includes:
  a driving transistor, wherein a gate of the driving transistor is electrically connected with a first node, one of a source and a drain of the driving transistor is electrically connected with a first power source, and the other of the source and the drain of the driving transistor is electrically connected with a second node;
  a first transistor, wherein a gate of the first transistor is electrically connected with a scan line, one of a source and a drain of the first transistor is electrically connected with a data line, and the other of the source and the drain of the first transistor is electrically connected with the first node;
  a second transistor, wherein a gate of the second transistor is electrically connected with a control line, one of a source and a drain of the second transistor is electrically connected with a first terminal, and the other of the source and the drain of the second transistor is electrically connected with the first node;
  a third transistor, wherein a gate of the third transistor is electrically connected with a detection line, one of a source and a drain of the third transistor is electrically connected with the second node, the other of the source and drain of the third transistor is electrically connected with a second terminal;
  a capacitor, wherein a first terminal of the capacitor is electrically connected with the first node, and a second terminal of the capacitor is electrically connected with the second node; and
  a light-emitting component, wherein a first terminal of the light-emitting component is electrically connected with the second node, and a second terminal of the light-emitting component is electrically connected with a second power source;
  wherein when the display panel is in an internal compensation mode, the first terminal is connected to receive a first initialization voltage, and the second terminal is connected to receive a second initialization voltage;
  when the display panel is in a detection mode, the second terminal is connected to receive a third initialization voltage, and the detection source is connected to receive a reference voltage and detects a voltage of the second node through the second terminal.

In a third aspect, a display device is further disclosed in the present disclosure, which includes:
  a gamma chip configured for outputting a first initialization voltage, a second initialization voltage, a third initialization voltage, and a reference voltage; and
  a display panel connected with the gamma chip, wherein the display panel includes a driving circuit, and the driving circuit includes:
  a gamma module configured for outputting the first initialization voltage and the second initialization voltage when the display panel is in an internal compensation mode, wherein the gamma module is further configured for outputting the third initialization voltage and the reference voltage when the display panel is in a detection mode; and
  a light-emitting module electrically connected with the gamma module, wherein when the display panel is in the internal compensation mode, the gamma module provides the first initialization voltage and the second initialization voltage to the light-emitting module to drive the light-emitting module to emit light; when the display panel is in the detection mode, the gamma module provides the third initialization voltage and the reference voltage to the light-emitting module to drive the light-emitting module to emit light.

In the display device disclosed in the present disclosure, the light-emitting module includes:
  a driving transistor, wherein a gate of the driving transistor is electrically connected with a first node, one of a source and a drain of the driving transistor is electrically connected with a first power source, and the other of the source and the drain of the driving transistor is electrically connected with a second node;
  a first transistor, wherein a gate of the first transistor is electrically connected with a scan line, one of a source and a drain of the first transistor is electrically connected with a data line, and the other of the source and the drain of the first transistor is electrically connected with the first node;
  a second transistor, wherein a gate of the second transistor is electrically connected with a control line, one of a source and a drain of the second transistor is electrically connected with the gamma module, and the other of the source and the drain of the second transistor is electrically connected with the first node;
  a third transistor, wherein a gate of the third transistor is electrically connected with a detection line, one of a source and a drain of the third transistor is electrically connected with the second node, the other of the source and drain of the third transistor is electrically connected with a first terminal of a first switching component and a first terminal of a second switching component, a second terminal of the first switching component is electrically connected with a first terminal of a detection source, and a second terminal of the second switching component and a second terminal of the detection source are electrically connected with the gamma module;
  a capacitor, wherein a first terminal of the capacitor is electrically connected with the first node, and a second terminal of the capacitor is electrically connected with the second node; and a light-emitting component, wherein a first terminal of the light-emitting component is electrically connected with the second node, and a second terminal of the light-emitting component is electrically connected with a second power source.

In the display device disclosed in the present disclosure, the gamma module includes a first output terminal an a second output terminal;

wherein the first output terminal is electrically connected with one of the source and the drain of the second transistor and the second terminal of the detection source, and the second output terminal is electrically connected with the second terminal of the second switching component.

In the display device disclosed in the present disclosure, the gamma module includes a first output terminal, a second output terminal, and a third output terminal;

wherein the first output terminal is electrically connected with one of the source and the drain of the second transistor, the second output terminal is electrically connected with the second terminal of the detection source, and the third output terminal is electrically connected with the second terminal of the second switching component.

In the display device disclosed in the present disclosure, the other of the source and the drain of the third transistor is further electrically connected with a first terminal of a third switching component, and a second terminal of the third switching component is electrically connected with the gamma module.

In the display device disclosed in the present disclosure, the gamma module includes a first output terminal, a second output terminal, a third output terminal, and a fourth output terminal;

wherein the first output terminal is electrically connected with one of the source and the drain of the second transistor, the second output terminal is electrically connected with the second terminal of the detection source, the third output terminal is electrically connected with the second terminal of the second switching component, and the fourth output terminal is electrically connected with the second terminal of the third switching component.

In the display device disclosed in the present disclosure, when the display panel is in the internal compensation mode, the third transistor is conducted, the fourth transistor is conducted, the first switching component is cut off, the second switching component is conducted, the first initialization voltage is provided to the first node through the third transistor, and the second initialization voltage is provided to the second node through the second switching component and the fourth transistor.

In the display device disclosed in the present disclosure, when the display panel is in the detection mode, the third transistor is cut off, the fourth transistor is conducted, the first switching component is conducted, the second switching component is conducted, the third initialization voltage is provided to the second node through the second switching component and the fourth transistor, the reference voltage is provided to the detection source, and the detection source detects a voltage of the second node through the first switching component.

Beneficial Effects

In the driving circuit, the display panel, and the display device disclosed in the present disclosure, the gamma module outputs the first initialization voltage and the second initialization voltage when the display panel is in the internal compensation mode, and the gamma module outputs the third initialization voltage and the reference voltage when the display panel is in the detection mode. Since the internal compensation mode and the detection mode are in different stages, they can be compatible with both the internal compensation mode and the detection mode without adding different voltages of power supplies

DESCRIPTION OF DRAWINGS

In order to describe the technical solutions in the embodiments of the present disclosure, the following briefly introduces the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

DETAILED DESCRIPTION OF PREFERRED EMBODIMENTS

The technical solutions in the embodiments of the present disclosure are clearly and completely described below in combination with the accompanying drawings in the embodiments of the present disclosure. Obviously, the described embodiments are only a part of the embodiments of the present disclosure rather than all of the embodiments. Based on the embodiments in the present disclosure, all other embodiments obtained by a person of ordinary skill in the art without creative efforts fall within the claim scope of the present disclosure. It should be understood that the specific embodiments described herein are only used to illustrate and explain the present disclosure and are not used to limit the present disclosure. The terms "first", "second", "third", "fourth" in the claims and the description of the present disclosure are used to distinguish different objects, rather than to describe a specific order.

Moreover, since the source and the drain of the transistor used in the present disclosure are symmetrical, the source and the drain are interchangeable. According to the configuration in the attached drawings, the middle terminal of the transistor is the gate, the signal input terminal is the source and the output terminal is the drain.

The embodiment of the present disclosure provides a driving circuit, a display panel, and a display device, which can be compatible with both the internal compensation mode and the detection mode without adding different power supply voltages. It should be noted that the driving circuit for the embodiment of the present disclosure can be compatible with both the internal compensation mode and the external compensation mode.

The disclosure is described in detail below. It should be noted that the order of description of the following embodiments is not a limitation on the preferred order of the embodiments. The transistors used in all embodiments of the present disclosure may be thin film transistors, field effect transistors, or other devices with the same characteristics. Moreover, the transistors used in the embodiments of the present disclosure may include P-type transistors and/or N-type transistors. When the gate of the P-type transistor is in a low voltage level, the source and the drain are conducted; when the gate is in a high voltage level, the source and drain are cut off. When the gate of the N-type transistor is in a high voltage level, the source and the drain are conducted; when the gate is in a low voltage level, the source and drain are cut off.

Figure 1:
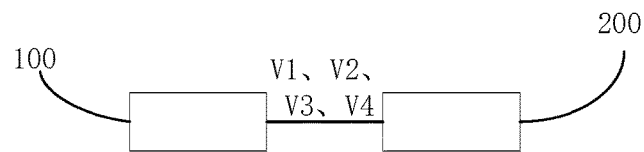
FIG. 1 is a structural diagram of a driving circuit disclosed in an embodiment of the present disclosure.

Reference is made to FIG. 1. FIG. 1 is a structural diagram of a driving circuit disclosed in an embodiment of the present disclosure. As shown in FIG. 1, the driving circuit disclosed in the embodiment of the present disclosure includes a gamma module 100 and a light-emitting module 200. The gamma module 100 is configured to output a first initialization voltage V1, a second initialization voltage V2, a third initialization voltage V3, and a reference voltage V4. The light-emitting module 200 is electrically connected with the gamma module 100. When the display panel is in an internal compensation mode, the gamma module 100 provides the first initialization voltage V1 and the second initialization voltage V2 to the light-emitting module 200 to drive the light-emitting module 100 to emit light. When the display panel is in a detection mode, the gamma module 100 provides the third initialization voltage V3 and the reference voltage V4 to the light-emitting module 200 to drive the light-emitting module 200 to emit light.

It should be noted that in the embodiment of the present disclosure, the display panel can be compatible with both the internal compensation mode and the detection mode. That is, the light-emitting module 200 of the driving circuit disclosed in the embodiment of the present disclosure may be adapted in not only a circuit structure of the internal compensation mode but also a structure of the detection mode.

In the driving circuit disclosed in the embodiment of the present disclosure, the gamma module 100 outputs the first initialization voltage V1 and the second initialization voltage V2 when the display panel is in the internal compensation mode, and the gamma module 100 outputs the third initialization voltage V3 and the reference voltage V4 when the display panel is in the detection mode. Since the internal compensation mode and the detection mode are in different periods, it can be compatible with both the internal compensation mode and detection mode without adding different power supply voltages.

Figure 2:
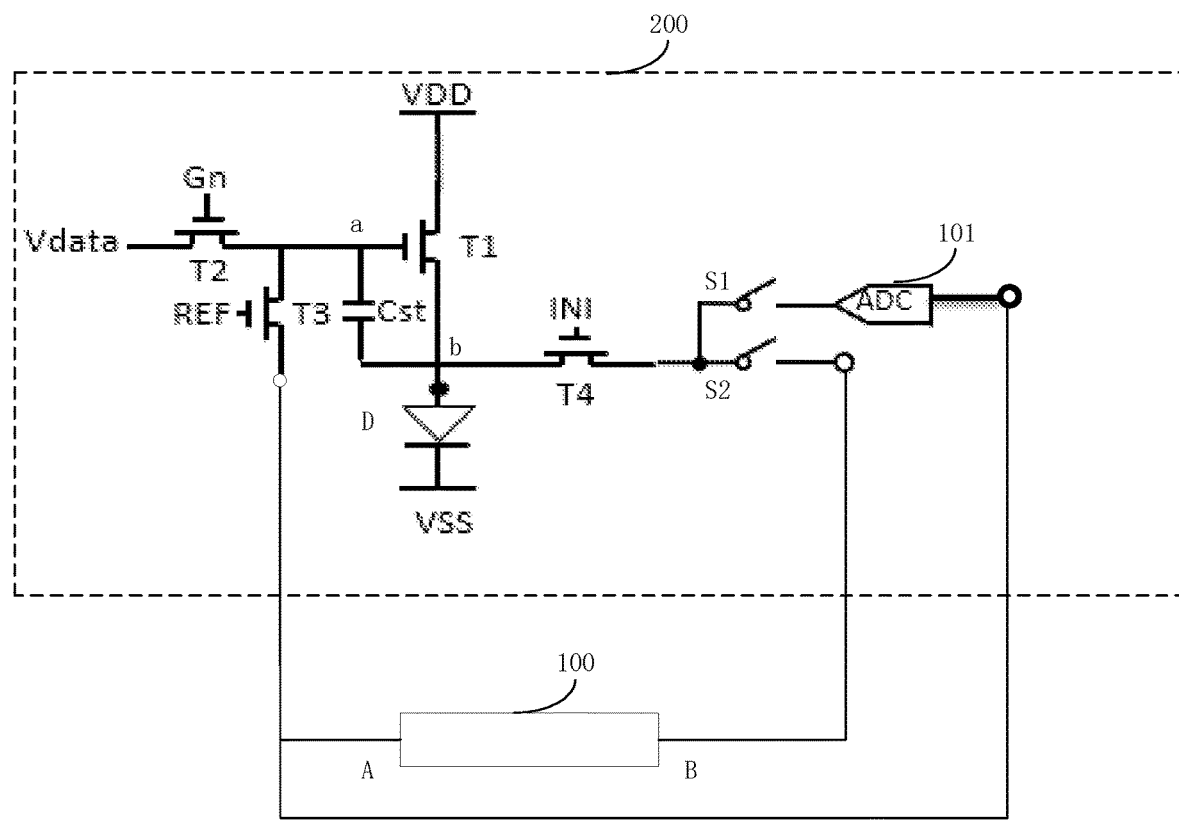
FIG. 2 is a first specific circuit diagram of the driving circuit shown in FIG. 1.

Reference is made to FIG. 2. FIG. 2 is a first specific circuit diagram of the driving circuit shown in FIG. 1. As shown in FIG. 1 in conjunction with FIG. 2, the light-emitting module 200 includes a driving transistor T1, a first transistor T2, a second transistor T3, a third transistor T4, a capacitor Cst, a light-emitting component D, a first switching component S1, a second switching component S2, and a detection source 101.

In the embodiment of the present disclosure, the gamma module 100 includes a first output terminal A and a second output terminal B. The first output terminal A is electrically connected with one of the source and drain of the second transistor T3 and the second terminal of the detection source 101, and the second output terminal B is electrically connected with the second terminal of the second switching component S2.

Moreover, the gate of the driving transistor T1 is electrically connected with a first node a, one of the source and the drain of the driving transistor T1 is electrically connected with a first power source VDD, and the other of the source and the drain of the driving transistor T1 is electrically connected with a second node b. The driving transistor T1 is configured to control the driving current flowing through the light-emitting component D.

Moreover, the gate of the first transistor T2 is electrically connected with a scan line GN, one of the source and the drain of the first transistor T2 is electrically connected with a data line Vdata, and the other of the source and the drain of the first transistor T2 is electrically connected with the first node a. The first transistor T2 is configured to provide the voltage supplied by the data line Vdata to the first node a under the control of the signal supplied by the scan line.

Moreover, the gate of the second transistor T3 is electrically connected with a control line REF, one of the source and the drain of the second transistor T3 is electrically connected with the gamma module 100, and the other of the source and the drain of the second transistor T3 is electrically connected with the first node a. The second transistor T3 is configured to provide the voltage supplied by the gamma module 100 to the first node a under the control of the signal supplied by the control line Ref.

Moreover, the gate of the third transistor T4 is electrically connected with a detection line INI, one of the source and the drain of the third transistor T4 is electrically connected with the second node b, and the other of the source and the drain of the third transistor T4 is electrically connected to the first terminal of the first switching component S1 and the first terminal of the second switching component S2. The second terminal of the first switching component S1 is electrically connected with the first terminal of the detection source 101, and the second terminal of the second switching component S2 and the second terminal of the detection source 101 are electrically connected with the gamma module 100. The third transistor T4 is configured to provide the voltage supplied by the gamma module 100 to the second node b under the control of the signal supplied by the detection line REF, and to detect the voltage of the second node b through the detection source 101.

Moreover, the first terminal of the capacitor Cst is electrically connected with the first node a, and the second terminal of the capacitor Cst is electrically connected with the second node b.

Moreover, the first terminal of the light-emitting component D is electrically connected with the second node b, and the second terminal of the light-emitting component D is electrically connected with a second power source VSS.

Figure 3:
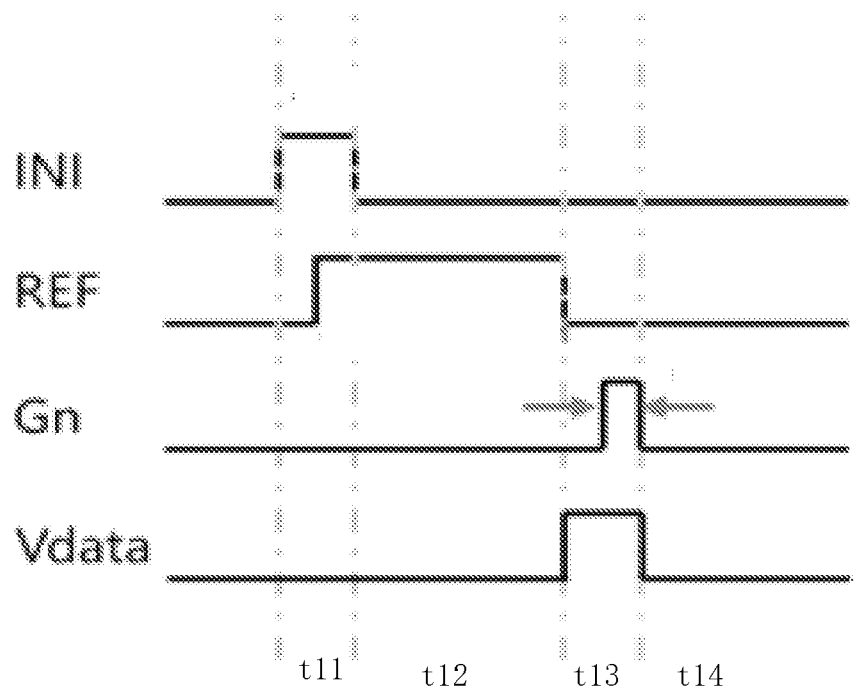
FIG. 3 is a timing diagram of the driving circuit disclosed in an embodiment of the present disclosure.

Reference is made to FIG. 3. FIG. 3 is a timing diagram of the driving circuit disclosed in the embodiment of the present disclosure. As shown in FIG. 1 in conjunction with FIG. 2 and FIG. 3, when the display panel is in the internal compensation mode, a driving sequence of the driving circuit includes an initialization stage t11, a detection stage t12, a writing stage t13, and a light-emitting stage t14.

In the initialization phase t11, the second transistor T3 is conducted under the control of the signal supplied by the control line REF, the third transistor T4 is conducted under the control of the signal supplied by the detection line INI, and the second switching component S2 is conducted. The first initialization voltage V1 supplied by the gamma module 100 is provided to the first node a through the second transistor T3, and the second initialization voltage V2 supplied by the gamma module 100 is provided to the second node b through the second switching component S2 and the third transistor T4, thereby finishing the initialization of the first node a and the second node b.

In the detection stage t12, the second transistor T3 is conducted under the control of the signal supplied by the control line REF, and the third transistor T4 is cut off under the control of the signal supplied by the detection line INI. The first initialization voltage V1 supplied by the gamma module 100 continues to be provided to the first node a through the second transistor T3. Moreover, the driving transistor T1 is conducted and the capacitor Cst is charged until the voltage of the second node b is equal to the difference between the first initialization voltage V1 and the threshold voltage of the driving transistor.

In the writing stage t13, the first transistor T2 is conducted under the control of the signal supplied by the scan line GN, and the voltage supplied by the data line Vdata is provided to the first node a through the first transistor T2, thereby finishing the writing of the data signal.

In the light-emitting stage t14, the first transistor T2 is cut off under the control of the signal supplied by the scan line GN, and the light-emitting component D emits light.

Figure 4:
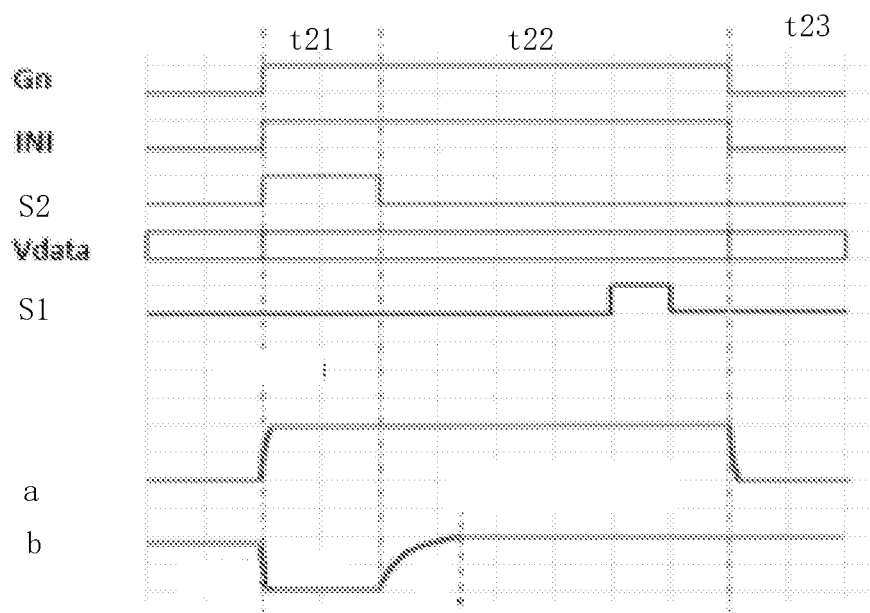
FIG. 4 is another timing diagram of the driving circuit disclosed in an embodiment of the present disclosure.

Reference is made to FIG. 4. FIG. 4 is another timing diagram of the driving circuit disclosed in the embodiment of the present disclosure. As shown in FIG. 1 in conjunction with FIG. 2 and FIG. 4, when the display panel is in the detection mode, a driving sequence of the driving circuit includes an initialization stage t21, a rising stage t22, and a detection stage t23.

In the initialization stage t21, the first transistor T2 is conducted under the control of the signal supplied by the scan line GN, the third transistor T4 is conducted under the control of the signal supplied by the detection line INI, and the second switching component S2 is conducted. The voltage supplied by the data line Vdata is provided to the first node a through the first transistor T2, and the third initialization voltage V3 supplied by the gamma module 100 is provided to the second node b through the second switching component S2 and the third transistor T4, thereby finishing the initialization of the first node a and the second node b.

In the rising stage t22, the first transistor T2 continues to turn on under the control of the signal supplied by the scan line GN, and the third transistor T4 turns off under the control of the signal supplied by the detection line INI. The voltage supplied by the data line Vdata continues to be provided to the first node a through the first transistor T2, the voltage of the second node b continues to rise from the third initialization voltage V3 until the voltage of the second node b is equal to the difference between the voltage supplied by the data line Vdata and the threshold voltage of the driving transistor, and the driving transistor T1 is cut off.

In the detection stage t23, the first transistor T2 continues to turn on under the control of the signal supplied by the scan line GN, the third transistor T4 turns on under the control of the signal supplied by the detection line INI, and the first switching component S1 turns on. The voltage supplied by the data line Vdata continues to be provided to the first node a through the first transistor T2, the reference voltage V4 supplied by the gamma module 100 is output to the detection source 101, and the detection source 101 detects the voltage of the second node b through the first switching component S1 and the third transistor T4, so that the threshold voltage of the driving transistor T1 can be calculated.

In the driving circuit disclosed in the present disclosure, the gamma module 100 outputs the first initialization voltage V1 at the first output terminal A and the second initialization voltage V2 at the second output terminal B when the display panel is in the internal compensation mode, and the gamma module 100 outputs the reference voltage V4 at the first output terminal A and the third initialization voltage V3 at the second output terminal B when the display panel is in the detection mode. Since the internal compensation mode and the detection mode are in different stages, it can be compatible with both the internal compensation mode and the detection mode without adding different power supply voltages.

Figure 5:
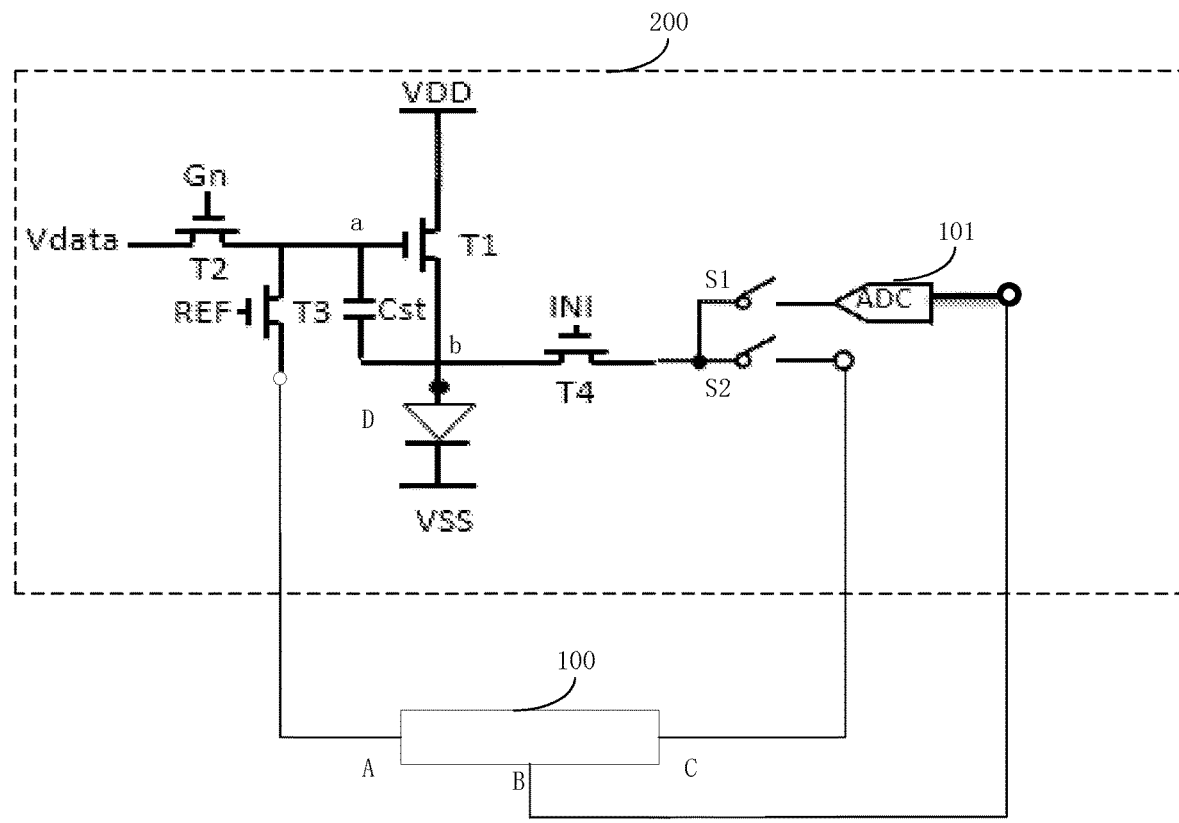
FIG. 5 is a second specific circuit diagram of the driving circuit shown in FIG. 1.

Reference is made to FIG. 5. FIG. 5 is a second specific circuit diagram of the driving circuit shown in FIG. 1. The difference between the driving circuit shown in FIG. 5 and the driving circuit shown in FIG. 2 is that in the driving circuit shown in FIG. 5, the gamma module 100 includes a first output terminal A, a second output terminal B, and a third output terminal C. The first output terminal A is electrically connected with one of the source and the drain of the second transistor T3, the second output terminal B is electrically connected with the second terminal of the detection source 101, and the third output terminal C is electrically connected with the second terminal of the second switching component S2.

In the driving circuit disclosed in the present disclosure, the gamma module 100 outputs the first initialization voltage V1 at the first output terminal A and the second initialization voltage V2 at the third output terminal C when the display panel is in the internal compensation mode, and the gamma module 100 outputs the reference voltage V4 at the second output terminal B and the third initialization voltage V3 at the third output terminal C when the display panel is in the detection mode. Since the internal compensation mode and the detection mode are in different stages, it can be compatible with both the internal compensation mode and the detection mode without adding different power supply voltages.

Figure 6:
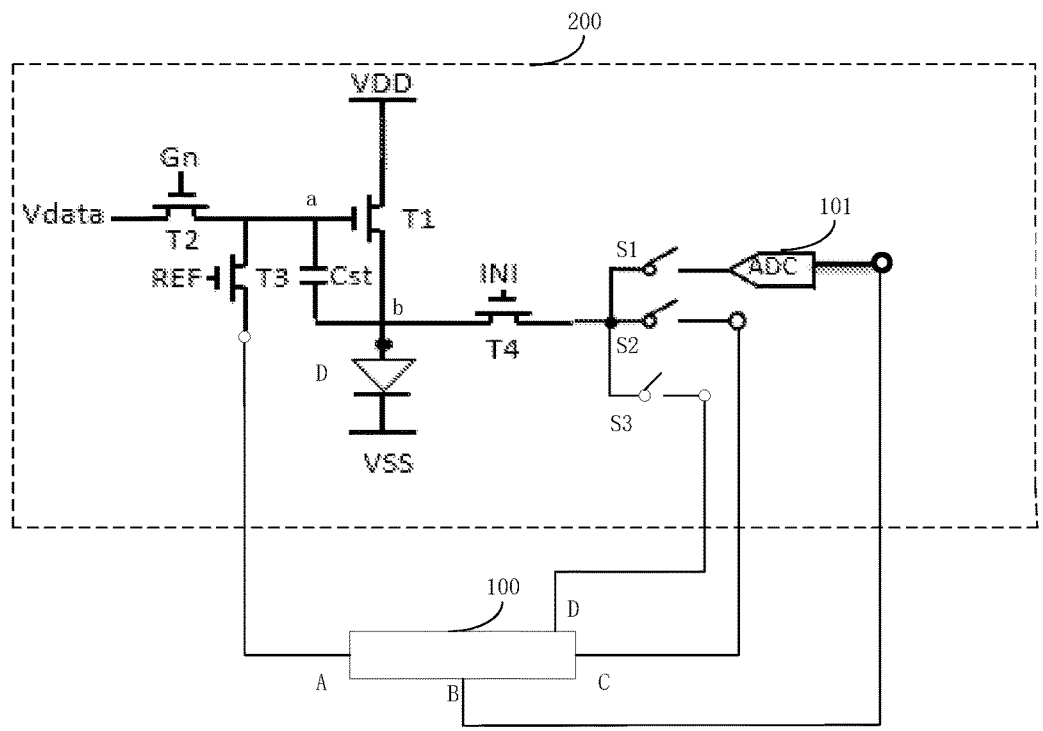
FIG. 6 is a third specific circuit diagram of the driving circuit shown in FIG. 1.

Reference is made to FIG. 6. FIG. 6 is a third specific circuit diagram of the driving circuit shown in FIG. 1. The difference between the driving circuit shown in FIG. 6 and the driving circuit shown in FIG. 2 is that in the driving circuit shown in FIG. 6, the other of the source and the drain of the third transistor T4 is further electrically connected with the first terminal of a third switching component S3, and the second terminal of the third switching component S3 is electrically connected with the gamma module 100. The gamma module 100 includes a first output terminal A, a second output terminal B, a third output terminal C, and a fourth output terminal D. Moreover, the first output terminal A is electrically connected with one of the source and the drain of the second transistor T3, the second output terminal B is electrically connected with the second terminal of the detection source 101, the third output terminal C is electrically connected with the second terminal of the second switching component S2, and the fourth output terminal D is electrically connected with the second terminal of the third switching component S3.

In the driving circuit disclosed in the present disclosure, the gamma module 100 outputs the first initialization voltage V1 at the first output terminal A and the second initialization voltage V2 at the third output terminal C when the display panel is in the internal compensation mode, and the gamma module 100 outputs the reference voltage V4 at the second output terminal B and the third initialization voltage V3 at the fourth output terminal D when the display panel is in the detection mode. Since the internal compensation mode and the detection mode are in different stages, it can be compatible with both the internal compensation mode and the detection mode without adding different power supply voltages.

Figure 7:
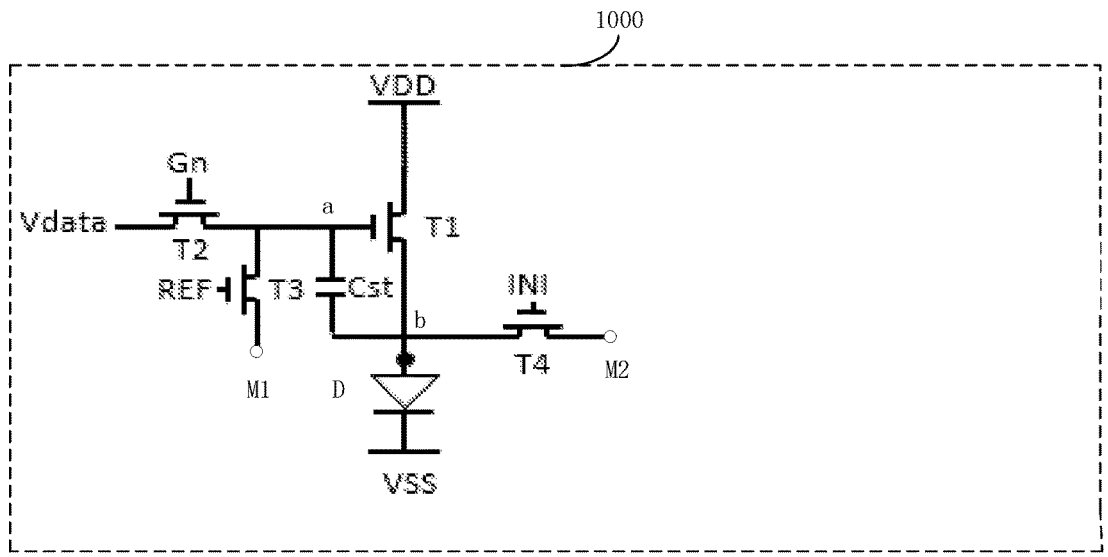
FIG. 7 is a structural diagram of a display panel disclosed in an embodiment of the present disclosure.

Reference is made to FIG. 7. FIG. 7 is a structural diagram of a display panel disclosed in an embodiment of the present disclosure. As shown in FIG. 7, the display panel 1000 provided by the embodiment of the present application includes a driving transistor T1, a first transistor T2, a second transistor T3, a third transistor T4, a capacitor Cst, and a light-emitting component D.

Moreover, the gate of the driving transistor T1 is electrically connected with the first node a, one of the source and the drain of the driving transistor T1 is electrically connected with the first power source VDD, and the other of the source and the drain of the driving transistor T1 is electrically connected with the second node b.

Moreover, the gate of the first transistor T2 is electrically connected with the scan line GN, one of the source and the drain of the first transistor T2 is electrically connected with the data line Vdata, and the other of the source and the drain of the first transistor T2 is electrically connected with the first node a.

Moreover, the gate of the second transistor T3 is electrically connected with the control line REF, one of the source and the drain of the second transistor T3 is electrically connected with a first terminal M1, and the other of the source and the drain of the second transistor T3 is electrically connected with the first node a.

Moreover, the gate of the third transistor T4 is electrically connected to the detection line INI, one of the source and the drain of the third transistor T4 is electrically connected to the second node b, and the other of the source and the drain of the third transistor T4 is electrically connected to a second terminal M2.

Moreover, the first terminal of the capacitor Cst is electrically connected with the first node a, and the second terminal of the capacitor Cst is electrically connected with the second node b.

Moreover, the first terminal of the light-emitting component D is electrically connected with the second node b, and the second terminal of the light-emitting component D is electrically connected with the second power source VSS.

It should be noted that when the display panel is in the internal compensation mode, the first terminal M1 is connected to receive the first initialization voltage and the second terminal M2 is connected to receive the second initialization voltage. When the display panel is in the detection mode, the second terminal M2 is connected to receive the third initialization voltage, and the detection source receives the reference voltage and detects the voltage of the second node b through the second terminal M2.

In the display panel disclosed in the present disclosure, the gamma module outputs the first initialization voltage and the second initialization voltage when the display panel is in the internal compensation mode, and the gamma module outputs the third initialization voltage and the reference voltage when the display panel is in the detection mode. Since the internal compensation mode and the detection mode are in different periods, it can be compatible with both the internal compensation mode and detection mode without adding different power supply voltages.

Figure 8:
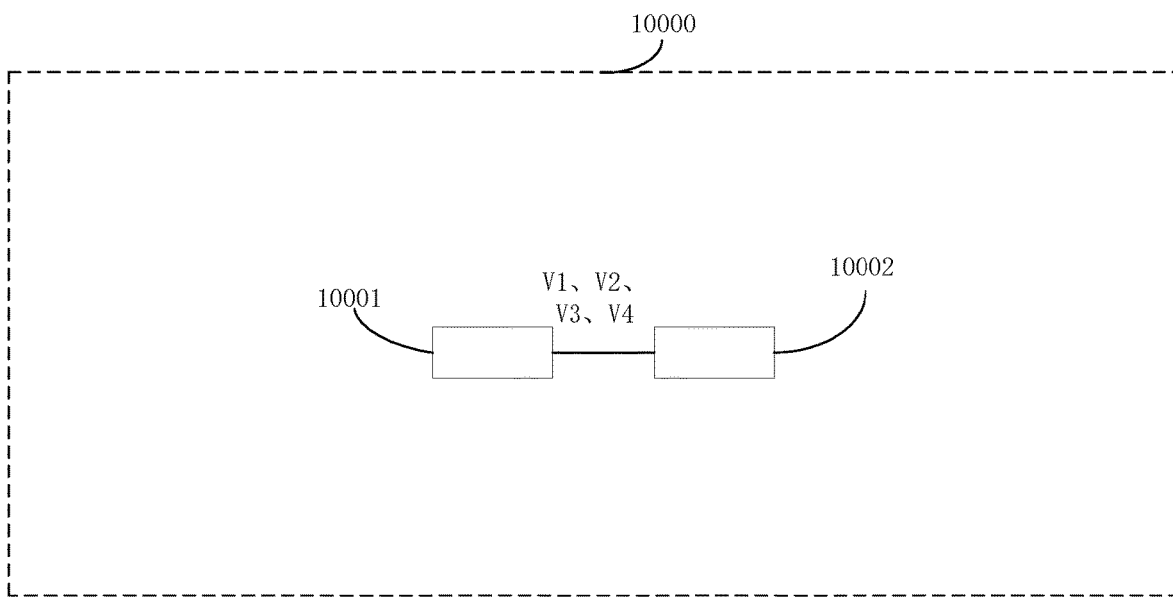
FIG. 8 is a structural diagram of a display device disclosed in an embodiment of the present disclosure.

Reference is made to FIG. 8. FIG. 8 is a structural diagram of a display device disclosed in an embodiment of the present disclosure. As shown in FIG. 8, the display device 10000 disclosed in the embodiment of the present disclosure includes a gamma chip 10001 and a display panel 10002. The gamma chip 1001 is configured to output the first initialization voltage V1, the second initialization voltage V2, the third initialization voltage V3, and the reference voltage V4. The display panel 10002 is electrically connected with the gamma chip 10001. The display panel 10001 includes the display panel described above, which may be referred to the aforementioned descriptions, and the further description is not provided herein.

In the display device disclosed in the present disclosure, the gamma module outputs the first initialization voltage and the second initialization voltage when the display panel is in the internal compensation mode, and the gamma module outputs the third initialization voltage and the reference voltage when the display panel is in the detection mode. Since the internal compensation mode and the detection mode are in different periods, it can be compatible with both the internal compensation mode and detection mode without adding different power supply voltages.

The driving circuit, display pane, and the display device disclosed in the embodiments of the present disclosure are described above in detail. Although the principles and implementations of the present disclosure are described by using specific examples in this specification, the descriptions of the foregoing embodiments are merely intended to help understand the method and the core idea of the method of the present disclosure. Meanwhile, a person of ordinary skill in the art may make modifications to the specific implementations and application range according to the idea of the present disclosure. In conclusion, the content of this specification should not be construed as a limit on the present disclosure.

What is claimed is:

1. A driving circuit configured for driving a display panel, comprising:
   a gamma module configured for outputting a first initialization voltage and a second initialization voltage when the display panel is in an internal compensation mode, wherein the gamma module is further configured for outputting a third initialization voltage and a reference voltage when the display panel is in a detection mode; and
   a light-emitting module electrically connected with the gamma module, wherein when the display panel is in the internal compensation mode, the gamma module provides the first initialization voltage and the second initialization voltage to the light-emitting module to drive the light-emitting module to emit light; when the display panel is in the detection mode, the gamma module provides the third initialization voltage and the reference voltage to the light-emitting module to drive the light-emitting module to emit light;
   wherein the light-emitting module comprises:
   a driving transistor, wherein a gate of the driving transistor is electrically connected with a first node, one of a source and a drain of the driving transistor is electrically connected with a first power source, and the other of the source and the drain of the driving transistor is electrically connected with a second node;
   a first transistor, wherein a gate of the first transistor is electrically connected with a scan line, one of a source and a drain of the first transistor is electrically connected with a data line, and the other of the source and the drain of the first transistor is electrically connected with the first node;
   a second transistor, wherein a gate of the second transistor is electrically connected with a control line, one of a source and a drain of the second transistor is electrically connected with the gamma module, and the other of the source and the drain of the second transistor is electrically connected with the first node;
a third transistor, wherein a gate of the third transistor is electrically connected with a detection line, one of a source and a drain of the third transistor is electrically connected with the second node, the other of the source and the drain of the third transistor is electrically connected with a first terminal of a first switching component and a first terminal of a second switching component, a second terminal of the first switching component is electrically connected with a first terminal of a detection source, and a second terminal of the second switching component and a second terminal of the detection source are electrically connected with the gamma module;
a capacitor, wherein a first terminal of the capacitor is electrically connected with the first node, and a second terminal of the capacitor is electrically connected with the second node; and
a light-emitting component, wherein a first terminal of the light-emitting component is electrically connected with the second node, and a second terminal of the light-emitting component is electrically connected with a second power source.

2. The driving circuit according to claim 1, wherein the gamma module comprises a first output terminal and a second output terminal;
wherein the first output terminal is electrically connected with one of the source and the drain of the second transistor and the second terminal of the detection source, and the second output terminal is electrically connected with the second terminal of the second switching component.

3. The driving circuit according to claim 1, wherein the gamma module comprises a first output terminal, a second output terminal, and a third output terminal;
wherein the first output terminal is electrically connected with one of the source and the drain of the second transistor, the second output terminal is electrically connected with the second terminal of the detection source, and the third output terminal is electrically connected with the second terminal of the second switching component.

4. The driving circuit according to claim 1, wherein the other of the source and the drain of the third transistor is further electrically connected with a first terminal of a third switching component, and a second terminal of the third switching component is electrically connected with the gamma module.

5. The driving circuit according to claim 4, wherein the gamma module comprises a first output terminal, a second output terminal, a third output terminal, and a fourth output terminal;
wherein the first output terminal is electrically connected with one of the source and the drain of the second transistor, the second output terminal is electrically connected with the second terminal of the detection source, the third output terminal is electrically connected with the second terminal of the second switching component, and the fourth output terminal is electrically connected with the second terminal of the third switching component.

6. The driving circuit according to claim 1, wherein when the display panel is in the internal compensation mode, the third transistor is conducted, the fourth transistor is conducted, the first switching component is cut off, the second switching component is conducted, the first initialization voltage is provided to the first node through the third transistor, and the second initialization voltage is provided to the second node through the second switching component and the fourth transistor.

7. The driving circuit according to claim 1, wherein when the display panel is in the detection mode, the third transistor is cut off, the fourth transistor is conducted, the first switching component is conducted, the second switching component is conducted, the third initialization voltage is provided to the second node through the second switching component and the fourth transistor, the reference voltage is provided to the detection source, and the detection source detects a voltage of the second node through the first switching component.

8. A display panel, comprising:
a driving transistor, wherein a gate of the driving transistor is electrically connected with a first node, one of a source and a drain of the driving transistor is electrically connected with a first power source, and the other of the source and the drain of the driving transistor is electrically connected with a second node;
a first transistor, wherein a gate of the first transistor is electrically connected with a scan line, one of a source and a drain of the first transistor is electrically connected with a data line, and the other of the source and the drain of the first transistor is electrically connected with the first node;
a second transistor, wherein a gate of the second transistor is electrically connected with a control line, one of a source and a drain of the second transistor is electrically connected with a first terminal, and the other of the source and the drain of the second transistor is electrically connected with the first node;
a third transistor, wherein a gate of the third transistor is electrically connected with a detection line, one of a source and a drain of the third transistor is electrically connected with the second node, the other of the source and the drain of the third transistor is electrically connected with a second terminal;
a capacitor, wherein a first terminal of the capacitor is electrically connected with the first node, and a second terminal of the capacitor is electrically connected with the second node; and
a light-emitting component, wherein a first terminal of the light-emitting component is electrically connected with the second node, and a second terminal of the light-emitting component is electrically connected with a second power source;
wherein when the display panel is in an internal compensation mode, the first terminal is connected to receive a first initialization voltage, and the second terminal is connected to receive a second initialization voltage, when the display panel is in a detection mode, the second terminal is connected to receive a third initialization voltage, and a detection source is connected to receive a reference voltage and detects a voltage of the second node through the second terminal.

9. A display device, comprising:
a gamma chip configured for outputting a first initialization voltage, a second initialization voltage, a third initialization voltage, and a reference voltage; and
a display panel connected with the gamma chip, wherein the display panel comprises a driving circuit, and the driving circuit comprises:

a gamma module configured for outputting the first initialization voltage and the second initialization voltage when the display panel is in an internal compensation mode, wherein the gamma module is further configured for outputting the third initialization voltage and the reference voltage when the display panel is in a detection mode; and a light-emitting module electrically connected with the gamma module, wherein when the display panel is in the internal compensation mode, the gamma module provides the first initialization voltage and the second initialization voltage to the light-emitting module to drive the light-emitting module to emit light; when the display panel is in the detection mode, the gamma module provides the third initialization voltage and the reference voltage to the light-emitting module to drive the light-emitting module to emit light;

wherein the light-emitting module comprises:

a driving transistor, wherein a gate of the driving transistor is electrically connected with a first node, one of a source and a drain of the driving transistor is electrically connected with a first power source, and the other of the source and the drain of the driving transistor is electrically connected with a second node;

a first transistor, wherein a gate of the first transistor is electrically connected with a scan line, one of a source and a drain of the first transistor is electrically connected with a data line, and the other of the source and the drain of the first transistor is electrically connected with the first node;

a second transistor, wherein a gate of the second transistor is electrically connected with a control line, one of a source and a drain of the second transistor is electrically connected with the gamma module, and the other of the source and the drain of the second transistor is electrically connected with the first node;

a third transistor, wherein a gate of the third transistor is electrically connected with a detection line, one of a source and a drain of the third transistor is electrically connected with the second node, the other of the source and the drain of the third transistor is electrically connected with a first terminal of a first switching component and a first terminal of a second switching component, a second terminal of the first switching component is electrically connected with a first terminal of a detection source, and a second terminal of the second switching component and a second terminal of the detection source are electrically connected with the gamma module;

a capacitor, wherein a first terminal of the capacitor is electrically connected with the first node, and a second terminal of the capacitor is electrically connected with the second node; and a light-emitting component, wherein a first terminal of the light-emitting component is electrically connected with the second node, and a second terminal of the light-emitting component is electrically connected with a second power source.

10. The display device according to claim 9, wherein the gamma module comprises a first output terminal and a second output terminal;

wherein the first output terminal is electrically connected with one of the source and the drain of the second transistor and the second terminal of the detection source, and the second output terminal is electrically connected with the second terminal of the second switching component.

11. The display device according to claim 9, wherein the gamma module comprises a first output terminal, a second output terminal, and a third output terminal;

wherein the first output terminal is electrically connected with one of the source and the drain of the second transistor, the second output terminal is electrically connected with the second terminal of the detection source, and the third output terminal is electrically connected with the second terminal of the second switching component.

12. The display device according to claim 9, wherein the other of the source and the drain of the third transistor is further electrically connected with a first terminal of a third switching component, and a second terminal of the third switching component is electrically connected with the gamma module.

13. The display device according to claim 12, wherein the gamma module comprises a first output terminal, a second output terminal, a third output terminal, and a fourth output terminal;

wherein the first output terminal is electrically connected with one of the source and the drain of the second transistor, the second output terminal is electrically connected with the second terminal of the detection source, the third output terminal is electrically connected with the second terminal of the second switching component, and the fourth output terminal is electrically connected with the second terminal of the third switching component.

14. The display device according to claim 9, wherein when the display panel is in the internal compensation mode, the third transistor is conducted, the fourth transistor is conducted, the first switching component is cut off, the second switching component is conducted, the first initialization voltage is provided to the first node through the third transistor, and the second initialization voltage is provided to the second node through the second switching component and the fourth transistor.

15. The display device according to claim 9, wherein when the display panel is in the detection mode, the third transistor is cut off, the fourth transistor is conducted, the first switching component is conducted, the second switching component is conducted, the third initialization voltage is provided to the second node through the second switching component and the fourth transistor, the reference voltage is provided to the detection source, and the detection source detects a voltage of the second node through the first switching component.

* * * * *